(12) United States Patent
Chuang et al.

(10) Patent No.: US 9,039,278 B2
(45) Date of Patent: May 26, 2015

(54) RATIO METER OF A THERMAL SENSOR

(71) Applicants: Mei-Chen Chuang, Xinyuan Township (TW); Jui-Cheng Huang, Hsinchu (TW); Alan Roth, Leander, TX (US)

(72) Inventors: Mei-Chen Chuang, Xinyuan Township (TW); Jui-Cheng Huang, Hsinchu (TW); Alan Roth, Leander, TX (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 275 days.

(21) Appl. No.: 13/754,151

(22) Filed: Jan. 30, 2013

(65) Prior Publication Data
US 2014/0211905 A1 Jul. 31, 2014

(51) Int. Cl.
*G01K 7/00* (2006.01)
*G01L 19/04* (2006.01)
*G01R 27/02* (2006.01)
*G01K 1/00* (2006.01)

(52) U.S. Cl.
CPC .......................................... *G01K 1/00* (2013.01)

(58) Field of Classification Search
None
See application file for complete search history.

(56) References Cited

U.S. PATENT DOCUMENTS

| 3,732,732 | A * | 5/1973 | Trethewey | 374/170 |
|---|---|---|---|---|
| 3,872,455 | A * | 3/1975 | Fuller et al. | 340/870.05 |
| 5,686,850 | A * | 11/1997 | Takaki et al. | 327/261 |
| 6,154,497 | A * | 11/2000 | Gatherer et al. | 375/247 |
| 6,288,588 | B1 * | 9/2001 | Frisch | 327/280 |
| 7,321,632 | B2 * | 1/2008 | Perets et al. | 375/262 |
| 7,331,708 | B2 * | 2/2008 | Blom et al. | 374/171 |
| 7,486,221 | B2 * | 2/2009 | Meyers et al. | 342/60 |
| 7,563,023 | B2 * | 7/2009 | Kuo et al. | 374/170 |
| 7,768,930 | B1 * | 8/2010 | Scholte | 370/244 |
| 2004/0120361 | A1 * | 6/2004 | Yu et al. | 370/545 |
| 2010/0164552 | A1 | 7/2010 | Luria et al. | |
| 2014/0294042 | A1 * | 10/2014 | Bruset et al. | 374/117 |

* cited by examiner

*Primary Examiner* — Peter Macchiarolo
*Assistant Examiner* — Jermaine Jenkins
(74) *Attorney, Agent, or Firm* — Lowe Hauptman & Ham, LLP

(57) ABSTRACT

A ratio meter includes a converter circuit, a first counter, a delay circuit, and a second counter. The converter circuit is configured to receive a temperature-independent signal, to convert the received temperature-independent signal into a first frequency signal during a first phase, to receive a temperature-dependent signal, and to convert the temperature-dependent signal into a second frequency signal during a second phase. The first counter is configured to receive the first frequency signal and to generate a control signal by counting a predetermined number of pulses of the first frequency signal count. The delay circuit is configured to delay the control signal for a predetermined time delay. The second counter is configured to receive the second frequency signal and to generate a count value by counting the second frequency signal.

24 Claims, 4 Drawing Sheets

RATIO METER OF A THERMAL SENSOR

BACKGROUND

Integrated circuits (ICs) typically generate heat when powered by an electric source such as a power supply. Overheating causes damage to the IC. Increases in clock speed, device activity, and the number of devices increases heat of the IC. A thermal management device employing a thermal sensor is typically used to prevent ICs from overheating. The thermal sensor detects a temperature of the IC. Analog circuitry is used to detect the temperature of the IC, and voltage and current characteristics are changed depending upon the temperature of the IC.

An output of the temperature related signal is typically input into an analog-to-digital converter (ADC) and converted to digital values. The analog circuitry typically includes a pair of ADCs for processing the output (e.g., a temperature independent signal and a temperature dependent signal). The temperature independent signal and the temperature dependent signal are compared with each other. Because the temperature independent signal and temperature dependent signal are processed using separate ADCs, there is an intrinsic offset of comparators of the ADCs and a nonlinearity of capacitance with regards to voltage and temperature, which affect a difference in the outputs thereof and accuracy of resulting output of the analog circuitry. A chopping process and/or a dynamic element matching (DEM) process are performed to eliminate the offset and non-linearity.

BRIEF DESCRIPTION OF THE DRAWINGS

Reference is now made to the following descriptions taken in conjunction with the accompanying drawings, in which.

DETAILED DESCRIPTION

The making and using of the embodiments of the disclosure are discussed in detail below. It should be appreciated, however, that the embodiments provide many applicable inventive concepts that can be embodied in a wide variety of specific contexts. The specific embodiments discussed are examples, and are not intended to limit the scope of the disclosure.

Figure 1:
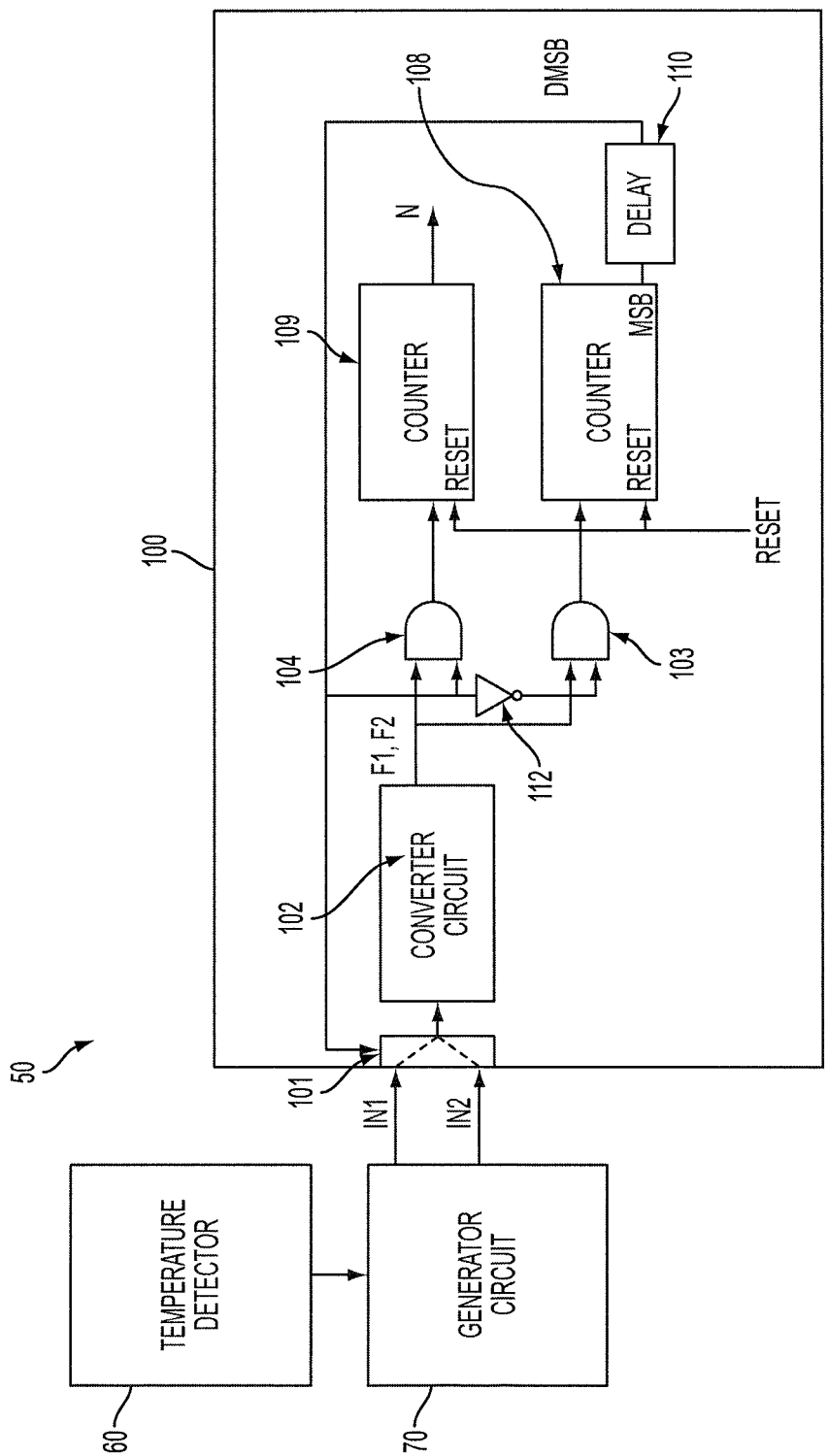
FIG. 1 is a block diagram of a thermal sensor having a ratio meter in accordance with one or more embodiments.

FIG. 1 is a block diagram of a thermal sensor 50 having a ratio meter 100 in accordance with one or more embodiments. The thermal sensor 50 further includes a temperature detector 60 and a generator circuit 70. The generator circuit 70 is coupled with the temperature detector 60 and the ratio meter 100.

The temperature detector 60 is configured to detect a temperature of an integrated circuit. The generator circuit 70 is configured to generate a temperature-independent signal IN1 and a temperature-dependent signal IN2, based on the detected temperature, to be input into the ratio meter 100 of the thermal sensor 50. According to some embodiments, the temperature detector 60 includes a diode capable of conversely proportional to absolute temperature (CTAT) performance and use of delta-VBE as a proportional to absolute temperature (PTAT) where a temperature independent signal is generated from the combination of the CTAT and PTAT sources. According to one or more embodiments, the temperature is an internal temperature of the integrated circuit. According to one or more embodiments, the temperature-independent signal IN1 and the temperature-dependent signal IN2 are voltage signals. In some embodiments, the temperature-independent signal IN1 is a fixed predetermined signal and the temperature-dependent signal IN2 is a signal which varies based on the temperature detected by the temperature detector 60. In other embodiments, the temperature-independent signal IN1 and the temperature-dependent signal IN2 are current signals. In some embodiments, the temperature-independent signal IN1 is a fixed predetermined current signal and the temperature-dependent signal IN2 is a current signal which varies based on the temperature detected by the temperature detector 60.

The generator circuit 70 is a voltage generating circuit for generating voltage signals corresponding to the temperature-independent signal IN1 and the temperature-dependent signal IN2. In other embodiments, the generator circuit 70 is a current generating circuit for generating current signals corresponding to the temperature-independent signal IN1 and the temperature-dependent signal IN2. In other embodiments, the generator circuit 70 is a voltage and current generator for generating voltage signals corresponding to the temperature independent signal IN1 and temperature dependent current signal IN2. In other embodiment, the generator circuit 70 is a voltage and current generator for generating current signals corresponding to the temperature independent signal IN1 and temperature dependent voltage signal IN2.

The ratio meter 100 is coupled with the generator circuit 70 and includes a multiplexer 101 coupled with an output of the generator circuit 70 and a converter circuit 102 coupled with an output of the multiplexer 101. An output of the converter circuit 102 is coupled with one input of a logic gate 103 and one input of a logic gate 104. The ratio meter 100 further includes a first counter 108 and a second counter 109, where the first counter 108 is coupled with an output of the logic gate 103 and the second counter 109 is coupled with an output of the logic gate 104. The ratio meter 100 further includes a delay circuit 110 having an input coupled with an output of the first counter 108 and an output coupled with an input of the multiplexer 101, and coupled with the other input of the logic gate 104. The ratio meter 100 further includes an inverter 112 disposed between the output of the delay circuit 110 and input of the logic gate 103. The inverter 112 includes an input also coupled with the output of the delay circuit 110 and an output coupled with the other input of the logic gate 103.

The multiplexer 101 is configured to select one of the temperature-independent signal IN1 and temperature-dependent signal IN2 to be input to the converter circuit 102 in a time-division multiplexing manner. The converter circuit 102 is configured to separately receive the temperature-independent signal IN1 and the temperature-dependent signal IN2 in a time-division multiplexing manner from the multiplexer 101 such that the converter circuit 102 processes the temperature-independent signal IN1 prior to processing the temperature-dependent signal IN2. The converter circuit 102 converts the temperature-independent signal IN1 into a first frequency signal F1.

In at least one embodiment, the converter circuit 102 is an analog-to-digital converter (ADC) for converting the voltage of the temperature-independent and temperature-dependent signals IN1 and IN2 into frequency signals. That is, the converter circuit 102 is a voltage-to-frequency (V2F) type converter.

In one or more embodiments, the converter circuit 102 is another type of V2F type converter without an ADC. In some embodiments, the V2F type converter circuit 102 includes a capacitor charged by a reference current source and a comparator that generates an oscillating signal by comparing an input voltage signal and a charged voltage at the capacitor. In some embodiments, if the voltage level of the input voltage signal increases, the period of the oscillating signal increases, and thus the frequency of the oscillating signal decreases.

According to one or more embodiments, the temperature-independent signal IN1 has a voltage level greater than that of the temperature-dependent signal IN2. For example, the temperature-independent signal IN1 is about 1.2 Volts (V) and the temperature-dependent signal is about 0.55 to 0.8 Volts (V).

In one or more embodiments, the converter circuit 102 is a current-to-frequency (I2F) type converter (as illustrated by converter circuit 300 in FIG. 3, for example) or other form of converter or transfer circuit to convert or transfer current or voltage to frequency or time. In some embodiments, the I2F type converter circuit 102 includes a capacitor charged by an input current signal and a comparator that generates an oscillating signal by comparing the charged voltage at the capacitor and a reference voltage signal. In some embodiments, if the current amount of the input current signal increases, the period of the oscillating signal decreases, and thus the frequency of the oscillating signal increases.

According to one or more embodiments, the temperature-independent signal IN1 has a current level greater than that of the temperature-dependent signal IN2.

In at least one embodiment, the logic gate 103 performs a logical operation on the output from the converter circuit 102 and the output of the inverter 112, and the logic gate 104 performs a logical operation on the output from the converter circuit 102 and the output of the delay circuit 110. The logic gates 103 and 104 each generate logic output to be input into corresponding first and second counters 108 and 109. According to one or more embodiments, the first and second logic gates 103 and 104 comprise Boolean AND gates or logic devices or other similar devices.

The first and second counters 108 and 109 are devices which count received pulses. The delay circuit 110 is a device for delaying, for a predetermined time delay (TD), the transmission of a signal resulting from a most significant bit (MSB) of the counted pulses of the first counter 108. The MSB is used as a control signal. The delay of the MSB is referred to as a DMSB signal or sometimes as a delayed control signal. The time delay (TD) is used to determine when to transmit the DMSB signal from the delay circuit 110 to the multiplexer 101 in order to select a next input signal (e.g., the temperature-dependent signal IN2) of the multiplexer 101. In some embodiments, if the DMSB signal is at a logic low level, the multiplexer 101 is set to select the temperature-independent signal IN1; if the DMSB signal is at a logic high level, the multiplexer 101 is set to select the temperature-dependent signal IN2. The DMSB signal is also transmitted to the input of the logic gate 104 and the inverter 112. According to one or more embodiments, the delay circuit 100 includes a series of inverters which delay the MSB for the predetermined time delay (TD).

At an initial operation of the converter circuit 102, the converter circuit receives and converts a voltage of the temperature-independent signal IN1 into the first frequency signal $F_1$.

Because in an initial state, the DMSB signal is at a logic low level, the inverter 112 causes a logic high level to be input to the logic gate 103 along with the first frequency signal F1, and thus the first frequency signal F1 is allowed to pass through the logic gate 103 and passed to the input of the first counter 108 from the output of the logic gate 103. The first frequency signal F1 is also input into the logic gate 104; however, because DMSB is at a logic low level, the output of the logic gate 104 is kept at a logic low level regardless of the first frequency signal F1 value.

The first counter 108 counts the number of received pulses from the logic gate 103 to a predetermined number of pulses, for example, 1024. The time period in which the first counter 108 counts to the predetermined number of pulses is referred to as a reference time $T_{REF}$. According to one or more embodiments, the maximum number of counts is 1024, for example. The MSB is used to delay the input of the temperature-dependent signal IN2 into the converter circuit 102. At the same time that the first frequency signal F1 is input into the first counter 108, the MSB is input into the delay circuit 110 and delayed by the predetermined time delay (TD). The DMSB signal is then sent to the multiplexer 101 on a select line thereof and selects which input signal (IN1 or IN2) is to be sent to an output of the multiplexer 101. In this embodiment, multiplexer 101 selects the temperature-dependent signal IN2 to be input into the converter 102 based on receipt of the DMSB signal from the delay circuit 110. The DMSB signal is also sent to the input of the inverter 112.

After the predetermined time delay (TD) when DMSB signal is at a logic high level, the temperature-dependent signal IN2 is input at the converter circuit 102 corresponding to the DMSB signal generated from the delay circuit 110. The inverted DMSB through the inverter 112 causes the logic gate 103 to output a logic low level to the first counter 108. The DMSB signal is also sent to the input of the logic gate 104 as a logic high level, to allow the output signal (which will be a second frequency signal F2 generated responsive to the temperature-dependent signal IN2) to be passed to the second counter 109.

Responsive to the temperature-dependent signal IN2, the second frequency signal F2 is generated from the converter circuit 102 and input into the logic gate 104 and the second counter 109 counts until the DMSB signal transitions to a low logic value and generates count value N corresponding to the temperature-dependent signal IN2 for example, 512 counts. The counting of the first counter 108 and the second counter 109 are performed for a same amount of time (reference time $T_{REF}$). The second counter 109 counts pulses for the reference time $T_{REF}$, at a time delay (TD) after the first counter 108 counts pulses for the reference time $T_{REF}$, as shown in FIG. 2.

The count value N generated from the second counter 109 is used to determine a ratio between the first frequency signal F1 and the second frequency signal F2 (i.e., F1/F2). The ratio is determined based on the predetermined number of pulses counted by the first counter 108 for the reference time $T_{REF}$ and the number of pulses counted by the second counter 109 for the reference time $T_{REF}$.

An external reset signal RESET is also provided to reset the first and second counters 108 and 109. The first counter 108 is configured to receive the reset signal RESET and is reset when it receives a logic low level from the logic gate 103. The second counter 109 is configured to receive the reset signal RESET and is reset after generating the output value of the ratio meter 100.

Figure 2:
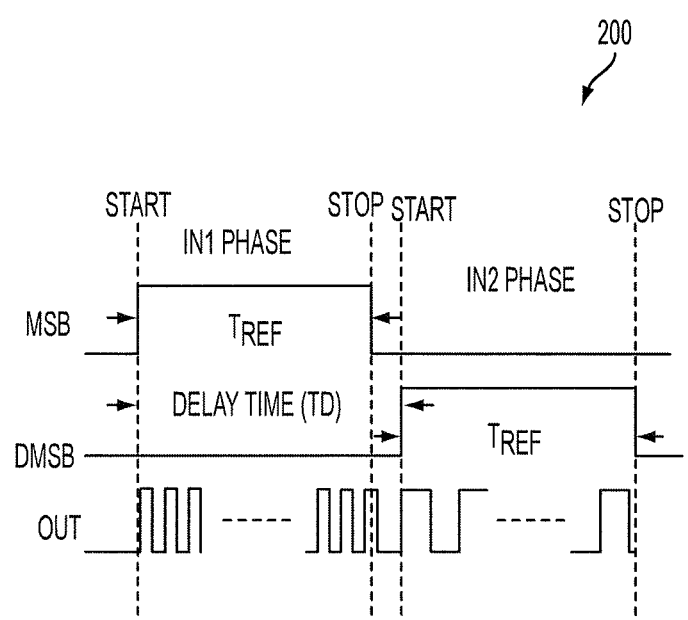
FIG. 2 is a timing diagram of operation of the ratio meter shown in FIG. 1 in accordance with one or more embodiments.

FIG. 2 is a timing diagram 200 of an operation of a ratio meter (such as ratio meter 100 shown in FIG. 1) in accordance with one or more embodiments. The temperature-independent signal IN1 is input into the converter circuit 102 during a first phase (e.g., IN1 PHASE) and the first frequency signal F1 is generated. The MSB signal of the first counter 108 is set to high at the beginning of the IN1 PHASE and thus transitions from a logic low level to a logic high level at time START of the IN1 PHASE. Meanwhile, the delayed MSB (DMSB) is still at a logic low level. The inversed DMSB is input into the logic gate 103, and the logic gate 103 allows the first frequency signal F1 to be passed to the first counter 108. The first counter 108 counts a predetermined number of pulses, for example 1024 pulses for the reference time $T_{REF}$, and the MSB transitions to a logic low level at time STOP of the IN I PHASE.

The delay circuit 110 also receives and delays the MSB, and maintains the DMSB signal in a logic low level for the predetermined time delay (TD) which extends throughout the reference time ($T_{REF}$) and beyond the predetermined reference time ($T_{REF}$) by an additional length of time such as 10 microseconds (µs). According to one or more embodiments, the time delay (TD) is longer than the reference time $T_{REF}$. If the delay time (TD) is not longer than the reference time $T_{REF}$, the first counter 108 will not complete the count of the predetermined number of pulses.

After the time delay (TD), the DMSB signal transitions into a logic high level at the time START of the second phase (IN2 PHASE) and is sent to the multiplexer 101, the input of the logic gate 104 and the inverter 112 in order to reuse the converter circuit 102 for the temperature-dependent signal IN2. During the second phase (IN2 PHASE), the converter circuit 102 converts the temperature-dependent signal IN2 into a second frequency signal F2 and the logic gate 104 receives the second frequency signal F2 along with the DMSB signal. The output of the logic gate 104 is then input into the second counter 109 and the second counter 109 counts receives pulses for the predetermined reference time ($T_{REF}$) as determined during the first phase (IN1 PHASE). The second counter 109 stops to count the second frequency signal F2 when the DMSB signal transitions from a logic high level to a logic low level at time STOP of the IN2 PHASE.

In one or more embodiments, the frequency signal F1 has a higher frequency than that of the frequency signal F2, and thus the output count value of the second counter 109 at the time STOP of IN2 PHASE is less than the predetermined count number for the frequency signal F1. In some embodiments, the frequency signal F1 has a lower frequency than that of the frequency signal F2, and thus the output count value of the second counter 109 at the time STOP of IN2 PHASE is greater than the predetermined count number for the frequency signal F1

Figure 3:
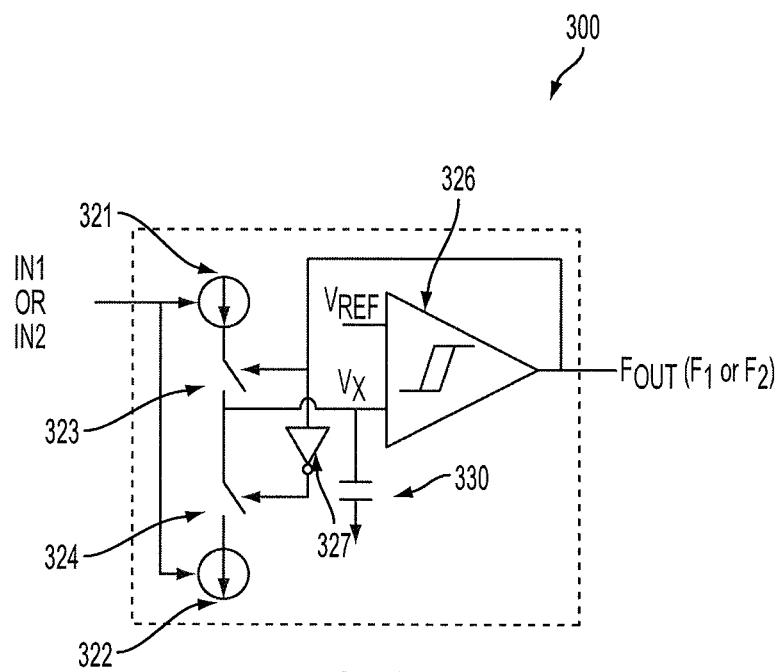
FIG. 3 is a converter circuit of the thermal sensor shown in FIG. 1 in accordance with one or more embodiments.

FIG. 3 is an example converter circuit 300 of the thermal sensor 50 shown in FIG. 1 in accordance with one or more alternative embodiments. The converter circuit 300 is a current-to-frequency converter to convert current signals of the temperature-independent signal IN1 and temperature-dependent signal IN2 into first and second frequency signals F1 and F2.

The converter circuit 300 includes a current source including a sink 321 and a source 322. The converter circuit 300 further includes a first switch device 323 having a first end coupled with the sink 321, and a second switch device 324 having a first end coupled with the source 322. Second ends of the first and second switch devices 323 and 324 are coupled to an input of a comparator 326. An output of the comparator 326 is coupled with an input of an inverter 327. An output of the inverter 327 is coupled to the second switch device 324. A capacitive device 330 is coupled with the input of the comparator 326. In some embodiments, the capacitive device 330 includes a capacitor.

The sink 321 and the source 322 are configured to provide the current source for the temperature-independent signal IN1 and the temperature-dependent signal IN2, and the first and second switch devices 323 and 324 are configured to be switched based on the signal to be supplied.

The comparator 326 is used to compare a voltage ($V_x$) generated based on the current signal received from sink 321 and source 322 and a reference voltage ($V_{REF}$). The inverter 327 is used to invert an output signal of the comparator 326. The capacitive device 330 is used to be charged or discharged by the sink 321 and the source 322 in order to provide the voltage (Vx). The sink and source 321 and 322 are generated by mirroring a current signal of the temperature-independent signal IN1 or a current signal of the temperature-independent signal IN2. In some embodiments, the first switch device 321 and the second switch device 322 are alternatively in a closed position and an open position in order to charge or discharge the capacitive device 330. The comparator circuit 326 receives a voltage signal $V_x$ corresponding to the voltage level at the capacitive device 330 and the reference voltage $V_{ref}$. The comparator 326 compares reference voltage $V_{REF}$ and voltage $V_x$ with each other and outputs a frequency signal $F_{out}$ (e.g., frequency signal F1 or frequency signal F2) having alternatively a high level or low level. The output frequency signal $F_{out}$ is then used to control a flow of current from the current source by controlling open and closed states of the first and second switch devices 323 and 324. The level of the output frequency signal $F_{out}$ (e.g., F1 and F2) is dependent upon the current level of the input signal IN1 or IN2.

Figure 4:
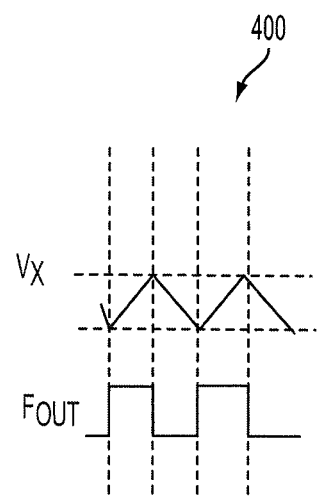
FIG. 4 is a timing diagram of operation of the converter circuit shown in FIG. 3 in accordance with one or more embodiments.

As shown in FIG. 4, if the voltage signal $V_x$ (minus a predetermined hysteresis voltage level) is less than the reference voltage $V_{REF}$ the output $F_{OUT}$ of comparator 326 is at a logic high signal, and the converter circuit 300 begins to charge the capacitive device 330. On the other hand, if the voltage signal $V_x$ (plus the predetermined hysteresis voltage level) is greater than the reference voltage $V_{REF}$, the output $F_{OUT}$ of comparator 326 is at a logic low signal, and the converter circuit 300 begins to discharge the capacitive device 330.

Figure 5:
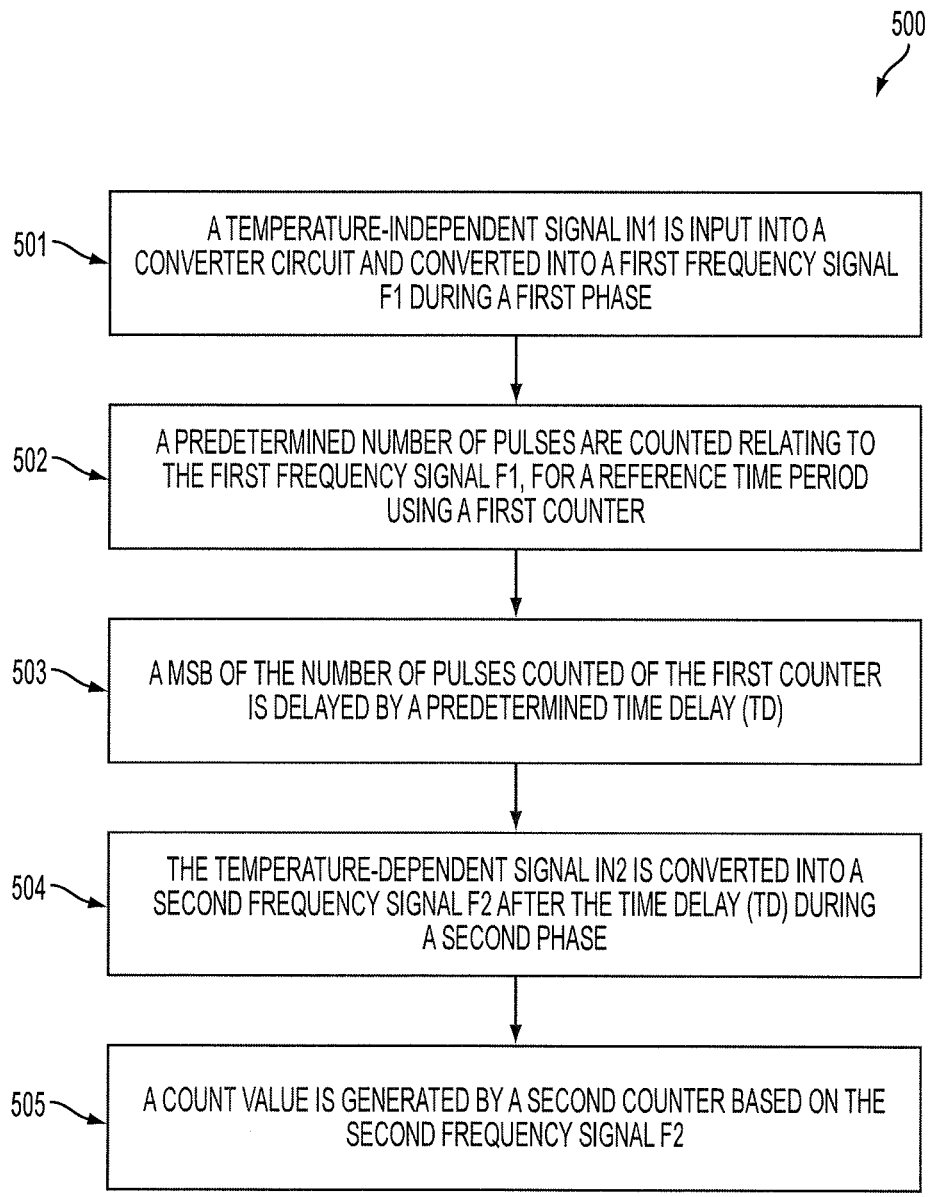
FIG. 5 is a process flow diagram of a method of operating a ratio meter in accordance with one or more embodiments.

FIG. 5 is a process flow diagram 500 of a method of the ratio meter 100 in accordance with one or more embodiments. In operation 501, a temperature-independent signal IN1 is input into a converter circuit (e.g., converter 102), and converted into a first frequency signal F1 during a first phase. From operation 501, the process continues to operation 502 where a predetermined number of pulses are counted for a predetermined reference time $T_{REF}$ using a first counter 108.

In operation 503, an MSB of the first counter 108 is delayed by a predetermined time delay (TD). From operation 503, the process continues to operation 504, where the temperature-dependent signal IN2 is converted into a second frequency signal F2 after the time delay (TD) during a second phase.

From operation 504, the process continues to operation 505, where a count value is then generated by a second counter 109 based on the second frequency signal F2 and the count value is used to determine a ratio between the predetermined number of pulses counted corresponding to the first frequency signal F1 and the number of pulses counted corresponding to the second frequency signal F2.

Use of a single converter circuit 102 within a ratio meter 100 of a thermal sensor 50, to process both a temperature-independent signal IN1 and a temperature-dependent signal IN2 in a time-division multiplexing manner eliminates intrinsic offset and non-linearity of voltage without a need for performing a chopping or DEM process.

In accordance with an embodiment, a ratio meter includes a converter circuit, a first counter, a delay circuit, and a second counter. The converter circuit is configured to receive a temperature-independent signal, to convert the received temperature-independent signal into a first frequency signal during a first phase, to receive a temperature-dependent signal, and to convert the temperature-dependent signal into a second frequency signal during a second phase. The first counter is configured to receive the first frequency signal and to generate a control signal by counting a predetermined number of pulses of the first frequency signal count. The delay circuit is configured to delay the control signal for a predetermined time delay. The second counter is configured to receive the second frequency signal and to generate a count value by counting the second frequency signal.

In accordance with another embodiment, a thermal sensor includes a temperature detector, a generator circuit, and the ration meter. The temperature detector is configured to detect a temperature. The generator circuit is coupled with the temperature detector and configured to generate a temperature-independent signal and a temperature-dependent signal. The ratio meter includes a converter circuit, a first counter, a delay circuit, and a second counter. The converter circuit is configured to receive a temperature-independent signal, to convert the received temperature-independent signal into a first frequency signal during a first phase, to receive a temperature-dependent signal, and to convert the temperature-dependent signal into a second frequency signal during a second phase. The first counter is configured to receive the first frequency signal and to generate a control signal by counting a predetermined number of pulses of the first frequency signal count. The delay circuit is configured to delay the control signal for a predetermined time delay. The second counter is configured to receive the second frequency signal and to generate a count value by counting the second frequency signal.

In accordance with yet another embodiment, a method of a ratio meter of a thermal sensor includes receiving a temperature-independent signal by a converter circuit during a first phase, and converting the temperature-independent signal into a first frequency signal. A control signal representing a reference time period for counting a predetermined number of pulses relating to the first frequency signal is generated. The control signal is delayed for a predetermined delay to generate a delayed control signal, and the delayed control signal defines a second phase having a time period equal to the reference time period. A temperature-dependent signal is received by the converter circuit during the second phase in response to the delayed control signal, and the temperature-dependent signal is converted into a second frequency signal. A count value relating to the second frequency signal during the second phase is generated.

Although the embodiments and their advantages have been described in detail, it should be understood that various changes, substitutions and alterations could be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A ratio meter comprising:
    a converter circuit configured to receive a temperature-independent signal, to convert the received temperature-independent signal into a first frequency signal during a first phase, to receive a temperature-dependent signal, and to convert the temperature-dependent signal into a second frequency signal during a second phase;
    a first counter configured to receive the first frequency signal and to generate a control signal by counting a predetermined number of pulses of the first frequency signal count;
    a delay circuit configured to delay the control signal for a predetermined time delay, the delayed control signal being usable to define the first phase when the delayed control signal is at a first logic level and the second phase when the delayed control signal is at a second logic level; and
    a second counter configured to receive the second frequency signal and to generate a count value by counting the second frequency signal.

2. The ratio meter of claim 1, further comprising a multiplexer configured to select one of the temperature-independent signal and the temperature-dependent signal to be input to the converter circuit.

3. The ratio meter of claim 1, wherein the converter circuit is a current-to-frequency converter and the temperature-independent signal is a first current signal and the temperature-dependent signal is a second current signal.

4. The ratio meter of claim 3, wherein the current-to-frequency converter is configured to receive the delayed control signal, and to receive one of the first current signal and the second current signal in response to the delayed control signal.

5. The ratio meter of claim 4, further comprising a first logic gate configured to receive the first frequency signal and a second logic gate configured to receive the second frequency signal.

6. The ratio meter of claim 5, wherein the first and second logic gates are Boolean AND logic gates.

7. The ratio meter of claim 4, wherein the current-to-frequency converter comprises:
    a current source comprising a source and a sink;
    a capacitive device;
    a first switch device corresponding to the sink of the current source and a second switch device corresponding to the source of the current source, and configured to switch between an open or closed state for charging or discharging the capacitive device; and
    a comparator circuit configured to receive a voltage signal corresponding to the capacitive device and a reference signal, and to output the first and second frequency signals.

8. The ratio meter of claim 1, wherein the converter circuit is a voltage-to-frequency converter, and the temperature-independent signal is a first voltage signal and the temperature-dependent signal is a second voltage signal.

9. The ratio meter of claim 8, wherein the voltage-to-frequency converter is configured to receive the delayed control signal, and to receive one of the first voltage signal and the second voltage signal in response to the delayed control signal.

10. The ratio meter of claim 9, comprising a first logic gate configured to receive the first frequency signal and a second logic gate configured to receive the second frequency signal.

11. The ratio meter of claim 10, wherein the first and second logic gates are Boolean AND logic gates.

12. A thermal sensor comprising:
a temperature detector configured to detect a temperature;
a generator circuit coupled with the temperature detector and configured to generate a temperature-independent signal and a temperature-dependent signal; and
a ratio meter comprising:
  a converter circuit configured to receive the temperature-independent signal and to convert the received temperature-independent signal into a first frequency signal during a first phase and to receive the temperature-dependent signal and convert the temperature-dependent signal into a second frequency signal during a second phase;
  a first counter configured to receive the first frequency signal and to generate a control signal by counting a predetermined number of pulses of the first frequency signal count;
  a delay circuit configured to delay the control signal for a predetermined time delay, the delayed control signal being usable to define the first phase when the delayed control signal is at a first logic level and the second phase when the delayed control signal is at a second logic level; and
  a second counter configured to receive the second frequency signal and to generate a count value by counting the second frequency signal.

13. The thermal sensor of claim 12, wherein the converter circuit is a current-to-frequency converter and the temperature-independent signal is a first current signal and the temperature-dependent signal is a second current signal.

14. The thermal sensor of claim 12, wherein the current-to-frequency converter is configured to receive the delayed control signal, and to receive one of the first current signal and the second current signal in response to the delayed control signal.

15. The thermal sensor of claim 14, further comprising a first logic gate configured to receive the first frequency signal and a second logic gate configured to receive the second frequency signal.

16. The thermal sensor of claim 15, wherein the first and second logic gates are Boolean AND logic gates.

17. The thermal sensor of claim 16, wherein the current-to-frequency converter comprises:

a current source comprising a source and a sink;
a capacitive device;
a first switch device corresponding to the sink of the current source and a second switch device corresponding to the source of the current source, and configured to switch between an open or closed state for charging or discharging the capacitive device; and
a comparator circuit configured to receive a voltage signal corresponding to the capacitive device and a reference signal, and to output the first and second frequency signals.

18. The thermal sensor of claim 12, wherein the converter circuit is a voltage-to-frequency converter, and the temperature-independent signal is a first voltage signal and the temperature-dependent signal is a second voltage signal.

19. The thermal sensor of claim 18, wherein the voltage-to-frequency converter is configured to receive the delayed control signal, and to receive one of the first voltage signal and the second voltage signal in response to the delayed control signal.

20. The thermal sensor of claim 19, comprising a first logic gate configured to receive the first frequency signal and a second logic gate configured to receive the second frequency signal.

21. The thermal sensor of claim 20, wherein the first and second logic gates are Boolean AND logic gates.

22. A method of a ratio meter of a thermal sensor, the method comprising:
receiving a temperature-independent signal by a converter circuit during a first phase, and converting the temperature-independent signal into a first frequency signal;
generating a control signal representing a reference time period for counting a predetermined number of pulses relating to the first frequency signal;
delaying the control signal for a predetermined delay to generate a delayed control signal, the delayed control signal defining a second phase having a time period equal to the reference time period;
receiving a temperature-dependent signal by the converter circuit during the second phase in response to the delayed control signal, and converting the temperature-dependent signal into a second frequency signal; and
generating a count value relating to the second frequency signal during the second phase.

23. The method of claim 22, wherein the generating of the control signal comprising:
setting the control signal to transit from a low logic level to a high logic level when start counting the first frequency signal by a counter; and
setting the control signal to transit from the high logic level to the low logic level when a count number of the counter reaches the predetermined number.

24. The method of claim 23, wherein setting of the control signal is performed based on an MSB of the counter.

\* \* \* \* \*